United States Patent [19]

Yamamoto et al.

[11] 4,431,446
[45] Feb. 14, 1984

[54] HIGH CAVITATION EROSION RESISTANCE STAINLESS STEEL AND HYDRAULIC MACHINES BEING MADE OF THE SAME

[75] Inventors: Masao Yamamoto, Tokyo; Takashi Yebisuya, Kawasaki; Mituo Kawai; Kei Honma, both of Yokohama, all of Japan

[73] Assignee: Tokyo Shibaura Denki Kabushiki Kaisha, Kanagawa, Japan

[21] Appl. No.: 274,481

[22] Filed: Jun. 17, 1981

[30] Foreign Application Priority Data

Jun. 17, 1980 [JP] Japan ............................ 55-80861
Jul. 21, 1980 [JP] Japan ............................ 55-98684
Sep. 11, 1980 [JP] Japan ............................ 55-125306
Dec. 8, 1980 [JP] Japan ............................ 55-1702015

[51] Int. Cl.³ ............................................ C22C 38/58
[52] U.S. Cl. .................................... 75/128 A; 148/38
[58] Field of Search ................. 75/128 A; 148/37, 38

[56] References Cited

U.S. PATENT DOCUMENTS

| | | | |
|---|---|---|---|
| 3,753,693 | 8/1973 | Espy | 75/128 A |
| 3,756,807 | 9/1973 | Hoshino et al. | 75/128 A |
| 3,902,823 | 9/1975 | Minato et al. | 75/128 A |
| 4,272,305 | 6/1981 | Weingerl et al. | 75/128 A |
| 4,285,725 | 8/1981 | Gysel et al. | 75/128 A |

Primary Examiner—W. Stallard
Attorney, Agent, or Firm—Cushman, Darby & Cushman

[57] ABSTRACT

Stainless steel suitable for use as water turbine elements for water power plants having high cavitation erosion resistance, comprised of at least one of either carbon or no more than 0.2 weight percent or nitrogen of 0.02-0.3 weight percent, together with silicon of 2.0 weight percent or less, chromium of 10.0-20.0 weight percent, nickel of 0.5-10.0 weight percent, manganese of over 2.0-20.0 weight percent, and the balance of essentially iron, and in which the ferrite phase has not been formed but where at least either the epsilon phase or the austenite phase has been essentially formed.

18 Claims, 5 Drawing Figures

HIGH CAVITATION EROSION RESISTANCE STAINLESS STEEL AND HYDRAULIC MACHINES BEING MADE OF THE SAME

BACKGROUND OF THE INVENTION

This invention relates to an improved type of stainless steel suitable for use in certain applications, such as in hydraulic machines which are required to have high cavitation erosion resistance and to the approaches for manufacturing or repairing such machinery.

Generator capacity in thermal and atomic power generators has recently become larger and larger, but it is difficult even for thermal and atomic power plants having these increased capacities to meet peak demands for electric power. One method for accommodating such a peak demand involves the construction of hydroelectric plants capable of rapidly changing their output and in particular the construction of pumped-storage power plants which use excess electric power at off peak periods to pump water to an elevated reservoir. The water remains in the reservoir until electric power is needed, at which times the water is passed through turbine generators.

The turbine usually employed in these pumped-storage power plants is the so-called "reversible pump turbine" type which generates electric power by day and pumps water by night. These power plants are being designed to operate with increasingly higher pressure heads and correspondingly higher outputs for the purpose of more efficiently using available building space and to reduce construction costs per unit output.

Cast steel (13-chromium cast steel, etc.) containing approximately 13 percent chromium by weight has conventionally been used as material for water turbine elements such as water turbine runners, guide vanes and stay vanes. Operating conditions, however, have become more and more severe. Consequently, the high velocity of water flow causes the formation of cavities on the surfaces of runner blades. When these cavities collapse on the runner blade surface they create repeated impulsive loads to be generated thereby damaging the surfaces of those runner blades. This is the so-called "cavitation erosion" that conventional materials cannot sufficiently resist.

Austenitic stainless steel, which has higher cavitation erosion resistance than the conventional 13-chromium cast steel, may be used as the manufacturing material for water turbine elements. The low proof stress of austenitic stainless steel permits it to be formed on cavitation erosion damaged surfaces by a manner of overlap welding.

Japanese Patent Disclosure No. 75984/80 discloses a stainless steel welding rod with cavitation erosion resistance comprised primarily of Cr and Ni with the Ni content being more than 7%, and the Cr content being more than 16%. Added to that Cr-Ni mixture is Co in an amount varying from 4 to 8%, and the final structure of the mixture exhibits the austenite and ferrite phases.

However, higher tread pressures and increased output capabilities have created a need for a material having superior cavitation erosion resistance from which turbine parts can be fabricated.

SUMMARY OF THE INVENTION

The invention comprises a high cavitation erosion resistance stainless steel, containing at least either carbon, or nitrogen or both as well as predetermined amounts of silicon, chromium, nickel, and manganese. The carbon is preferably present in an amount no more than about 0.2 weight percent, while the amount of nitrogen preferably ranges from about 0.02 to about 0.3 weight percent. The amount of silicon should not be more than about 2.0 weight percent, the amount of chromium should range between about 10.0 to about 20.0 weight percent, the amount of nickel should range from about 0.5 to about 10.0 weight percent, and the amount of manganese is preferably in excess of about 2.0 and preferably not more than about 20.0 weight percent. The balance of the alloy, is essentially iron, and the ferrite phase has not been formed in the alloy but at least either the Epsilon phase and the austenite phase has been essentially formed in the alloy.

According to this invention, those portions of hydraulic machines where there are surfaces susceptible of being damaged by cavitation erosion will be made of the above-mentioned stainless steel.

Stainless steel of this invention has superior cavitation erosion resistance and lower proof stress than that of the 13-chromium cast steel and the conventional SUS 304 austenitic stainless steel.

Accordingly, it is one object of this invention to provide stainless steel having excellent cavitation erosion resistance.

It is another object to produce hydraulic machines having surfaces which may be damaged by cavitation erosion clad with this improved stainless steel which exhibits lower proof stress and which resists cracking when welded to other metals.

It is a further object of this invention to manufacture hydraulic machines in which the stainless steel of the present invention is formed on the surface of cavitation erosion damaged portions thereof through overlay welding techniques.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EXEMPLARY EMBODIMENT

Figure 1:
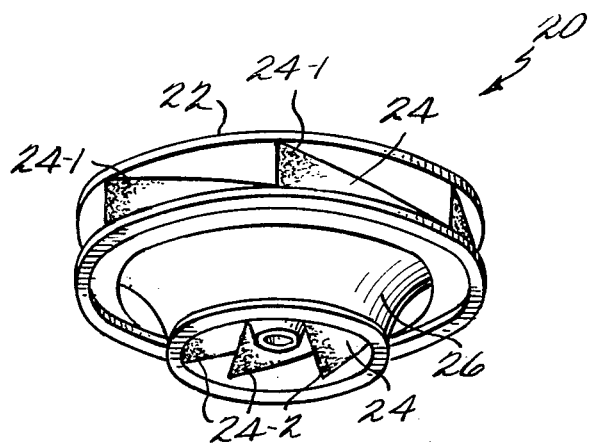
FIG. 1 is a perspective view showing a water turbine runner for use in turbines constructed from the improved stainless steel according to the present invention.

Stainless steel prepared according to the present invention has excellent cavitation erosion resistance when the epsilon (hereinafter $\xi$ phase) and/or austenite phase (hereinafter $\gamma$ phase) have been formed as a main phase in stainless steel. However, the cavitation erosion resistance of stainless steel is reduced when the ferrite phase (hereinafter $\alpha$ phase) is formed. Therefore, the main phase formed in stainless steel of the present invention should not be the $\alpha$ phase but should be the $\xi$ phase or the $\gamma$ phase. A little martensite phase (hereinafter $\alpha'$) may be formed together with the $\xi$ phase or the $\gamma$ phase.

Stainless steel according to the present invention is an alloy which may contain any of a number of additional elements such as carbon, nitrogen, silicon, chromium, nickel, and manganese. The ranges of the preferred content of these elements has been empirically determined, and it will be described below how additional elements should be added and why these additional elements should be limited in amount to yield stainless steel of the present invention.

Carbon employed in the production of stainless steel according to the present invention serves to form the $\xi$ phase and/or the $\gamma$ phase during the heat-treatment used to enhance the cavitation erosion resistance of the steel. However, an excessive amount of carbon reduces the corrosion resistance and toughness of the steel. Accordingly, the maximum carbon content should not exceed about 0.2 weight percent of the weight of the mixture. The preferred range for the carbon content is from about 0.03 to about 0.15 weight percent.

Nitrogen is added instead of, or together with carbon and also forms the $\xi$ and/or $\gamma$ phase in stainless steel to enhance cavitation erosion resistance and corrosion resistance. The nitrogen content is preferably in the range of about 0.02 to about 0.3 weight percent. The effect of adding less than about 0.02 weight percent nitrogen is insufficient to produce the desired result, and the addition of more than about 0.3 weight percent nitrogen causes pin-holes and blow-holes in the stainless steel.

Silicon enhances the castability of stainless steel when molten. However, the addition of more than about 2.0 weight percent silicon reduces the toughness of the stainless steel. It is preferable to add silicon in amounts ranging between about 0.2 and about 1.0 weight percent.

Chromium is important to enhance the corrosion resistance of stainless steel and is preferably added in an amount above about 10.0 weight percent in order to produce what we believe to be significant effects. If chromium content exceeds about 20.0 weight percent, however, the $\alpha$ phase is formed in stainless steel, thereby reducing cavitation erosion resistance. The chromium content preferably ranges from about 11.0 to about 15.0 weight percent and more preferably is about 13.0 weight percent.

Nickel enhances the cavitation erosion resistance and the toughness of stainless steel. The effect of the addition of less than about 0.5 weight percent nickel is not enough and there are only marginal benefits obtained by increasing nickel content above about 10.0 weight percent, and do not justify the additional cost. Accordingly, while nickel preferably ranges from about 0.5 to about 10.0 weight percent, the more preferred range is from about 2.0 to about 8.0 weight percent and the most desirable is from about 3.0 to about 7.0 weight percent.

Manganese also plays a particularly important role in the formation of the $\xi$ phase or the $\gamma$ phase, thus enhancing cavitation erosion resistance of the stainless steel of the present invention. Addition of less than about 2.0 weight percent of manganese has an insufficient effect, while the addition of more than about 20.0 weight percent manganese degrades machinability. Therefore, the preferred range of manganese content is from about 2.0 to about 20.0 weight percent. In practice, it is preferable to add manganese in an amount ranging from about 4.0 to about 15.0 weight percent.

In addition to the above-mentioned elements, the improved stainless steel prepared according to the present invention may also include one or more elements selected from the group consisting of molybdenum, cobalt and niobium.

Molybdenum is important in enhancing the cavitation erosion resistance and the corrosion resistance of stainless steel. The added amount of molybdenum should be no more than about 2.0 weight percent, and preferably in the range of about 0.5 to about 1.5 weight percent and more preferably in the range of about 1.0 to about 1.5 weight percent.

Cobalt also enhances cavitation erosion resistance and is preferably present in an amount ranging between about 0.5 to about 5.0 weight percent. Adding less than about 0.5 weight percent produces a negligible effect and adding more than about 5.0 weight percent increases costs without increasing cavitation erosion resistance. As a practical matter, we believe it is preferable to add cobalt in an amount varying from about 0.5 to about 3.0 weight percent and more preferably in an amount ranging from about 1.5 to about 2.0 weight percent.

Niobium promotes fine grain size of stainless steel and enhances cavitation erosion resistance. The amount of niobium that can be added for that purpose range from about 0.01 to about 0.1 weight percent. The addition of less than about 0.1 weight percent of niobium induces the formation of $\alpha$ phase stainless steel, which exhibits a lower cavitation erosion resistance and is therefor not desirable for present purposes. As a practical matter, however, we have found it preferable to add niobium in an amount ranging from about 0.01 to about 0.05 weight percent and more preferably about 0.03 weight percent.

In addition to the above-mentioned elements, stainless steel prepared according to the present invention may also include one or more elements selected from the group consisting of hafnium, titanium, tantalum and zirconium.

In producing stainless steel according to the present invention, melting can be carried out by any conventional process including the use of induction or electric arc furnaces, for example, and casting may be achieved by any conventional method.

The following tables serve to establish the superior qualities of a stainless steel alloy according to the present invention.

TABLE 1

| Example | C | N | Si | Cr | Ni | Mn | Mo | Nb | Co | Fe |
|---------|---|---|----|----|----|----|----|----|----|----|

TABLE 1-continued

|    | C    | N    | Si   | Cr    | Ni   | Mn    | Mo   | Nb   | Co   | Fe      |
|----|------|------|------|-------|------|-------|------|------|------|---------|
| 1  | 0.05 | —    | 0.32 | 13.16 | 3.48 | 8.07  | —    | —    | —    | Balance |
| 2  | 0.06 | —    | 0.32 | 13.08 | 6.12 | 5.13  | —    | —    | —    | "       |
| 3  | 0.05 | —    | 0.31 | 13.21 | 6.05 | 12.95 | —    | —    | —    | "       |
| 4  | 0.05 | —    | 0.31 | 13.00 | 6.24 | 7.04  | —    | 0.03 | —    | "       |
| 5  | 0.05 | —    | 0.29 | 13.15 | 6.11 | 5.26  | —    | —    | 1.50 | "       |
| 6  | 0.06 | —    | 0.32 | 13.14 | 6.09 | 5.19  | —    | 0.04 | 1.47 | "       |
| 7  | 0.06 | —    | 0.37 | 13.46 | 1.48 | 11.86 | 0.53 | —    | —    | "       |
| 8  | 0.05 | —    | 0.33 | 13.19 | 3.51 | 8.40  | 0.51 | —    | —    | "       |
| 9  | 0.05 | —    | 0.32 | 13.24 | 6.08 | 5.23  | 1.46 | —    | —    | "       |
| 10 | 0.05 | —    | 0.31 | 13.18 | 6.11 | 8.32  | 0.57 | —    | —    | "       |
| 11 | 0.04 | —    | 0.31 | 13.16 | 6.13 | 13.50 | 0.60 | —    | —    | "       |
| 12 | 0.12 | —    | 0.33 | 13.21 | 3.45 | 5.30  | 1.39 | —    | —    | "       |
| 13 | 0.05 | —    | 0.37 | 13.21 | 3.60 | 8.05  | 0.57 | 0.03 | —    | "       |
| 14 | 0.05 | —    | 0.34 | 13.17 | 6.12 | 8.11  | 0.55 | 0.03 | —    | "       |
| 15 | 0.06 | —    | 0.32 | 13.26 | 6.13 | 5.24  | 1.49 | 0.05 | —    | "       |
| 16 | 0.04 | —    | 0.33 | 13.31 | 3.45 | 8.04  | 0.50 | —    | 1.47 | "       |
| 17 | 0.05 | —    | 0.33 | 13.47 | 3.72 | 10.11 | 0.55 | —    | 4.03 | "       |
| 18 | 0.05 | —    | 0.35 | 13.29 | 6.18 | 5.20  | 1.48 | —    | 1.51 | "       |
| 19 | 0.04 | —    | 0.31 | 13.02 | 3.09 | 9.11  | —    | —    | —    | "       |
| 20 | 0.04 | —    | 0.34 | 12.96 | 1.37 | 11.24 | 0.57 | —    | —    | "       |
| 21 | 0.04 | —    | 0.34 | 13.04 | 5.88 | 3.79  | 0.54 | —    | —    | "       |
| 22 | 0.05 | —    | 0.36 | 13.12 | 5.91 | 9.60  | 0.59 | —    | —    | "       |
| 23 | 0.05 | —    | 0.31 | 13.10 | 7.06 | 13.74 | 0.53 | —    | —    | "       |
| 24 | 0.04 | —    | 0.33 | 12.97 | 8.16 | 4.58  | 0.53 | —    | —    | "       |
| 25 | 0.05 | —    | 0.35 | 13.19 | 2.79 | 9.24  | 1.40 | —    | —    | "       |
| 26 | 0.06 | —    | 0.34 | 13.30 | 6.14 | 5.42  | 1.61 | —    | —    | "       |
| 27 | 0.15 | —    | 0.31 | 13.21 | 2.35 | 4.73  | 0.55 | —    | —    | "       |
| 28 | 0.04 | —    | 0.33 | 12.92 | 3.37 | 7.42  | 0.48 | 0.03 | —    | "       |
| 29 | 0.05 | —    | 0.37 | 13.14 | 5.75 | 7.59  | 0.50 | 0.03 | —    | "       |
| 30 | 0.05 | —    | 0.32 | 13.24 | 8.10 | 4.83  | 0.51 | 0.03 | —    | "       |
| 31 | 0.05 | —    | 0.34 | 13.21 | 6.03 | 12.71 | 0.57 | 0.05 | —    | "       |
| 32 | 0.05 | —    | 0.32 | 13.07 | 1.17 | 11.53 | 0.59 | —    | 1.48 | "       |
| 33 | 0.05 | —    | 0.31 | 13.04 | 3.60 | 9.81  | 0.55 | —    | 4.02 | "       |
| 34 | 0.04 | —    | 0.35 | 12.95 | 6.23 | 4.90  | 0.53 | —    | 1.51 | "       |
| 35 | 0.07 | —    | 0.36 | 17.86 | 6.11 | 5.10  | 1.52 | 0.03 | 1.32 | "       |
| 36 | —    | 0.08 | 0.33 | 13.19 | 3.36 | 8.25  | —    | —    | —    | "       |
| 37 | —    | 0.10 | 0.32 | 13.26 | 6.14 | 12.97 | —    | —    | —    | "       |
| 38 | —    | 0.07 | 0.31 | 13.18 | 6.19 | 6.88  | —    | 0.03 | —    | "       |
| 39 | —    | 0.08 | 0.31 | 13.27 | 6.25 | 5.19  | —    | —    | 1.62 | "       |
| 40 | —    | 0.10 | 0.32 | 13.05 | 6.22 | 5.26  | —    | 0.03 | 1.57 | "       |
| 41 | —    | 0.15 | 0.33 | 13.15 | 5.93 | 5.07  | 1.50 | —    | —    | "       |
| 42 | —    | 0.10 | 0.33 | 18.12 | 6.14 | 5.09  | 1.63 | 0.04 | 1.46 | "       |
| 43 | 0.03 | 0.05 | 0.33 | 13.11 | 6.14 | 5.35  | —    | —    | —    | "       |
| 44 | 0.02 | 0.07 | 0.30 | 13.04 | 3.53 | 8.14  | —    | 0.03 | 1.50 | "       |
| 45 | 0.03 | 0.05 | 0.33 | 13.34 | 1.51 | 11.85 | 0.52 | —    | —    | "       |
| 46 | 0.03 | 0.06 | 0.32 | 13.08 | 3.56 | 8.47  | 0.51 | —    | —    | "       |
| 47 | 0.02 | 0.05 | 0.33 | 13.49 | 6.03 | 5.31  | 1.48 | —    | —    | "       |
| 48 | 0.04 | 0.04 | 0.31 | 13.16 | 6.15 | 8.34  | 0.54 | —    | —    | "       |
| 49 | 0.04 | 0.04 | 0.33 | 13.43 | 6.19 | 13.55 | 0.56 | —    | —    | "       |
| 50 | 0.08 | 0.02 | 0.33 | 13.27 | 3.53 | 5.37  | 1.42 | —    | —    | "       |
| 51 | 0.04 | 0.03 | 0.32 | 13.39 | 6.27 | 5.23  | 1.48 | 0.05 | —    | "       |
| 52 | 0.02 | 0.05 | 0.32 | 13.51 | 3.77 | 10.14 | 0.57 | —    | 4.02 | "       |
| 53 | 0.03 | 0.05 | 0.33 | 13.12 | 3.49 | 8.09  | 0.51 | 0.03 | 1.48 | "       |

Control

|   | C    | N | Si   | Cr    | Ni   | Mn   | Mo   | Nb | Co | Fe |
|---|------|---|------|-------|------|------|------|----|----|----|
| 1 | 0.06 | — | 0.29 | 18.18 | 8.14 | 0.79 | —    | —  | —  | "  |
| 2 | 0.05 | — | 0.37 | 13.41 | 3.60 | 0.52 | 0.56 | —  | —  | "  |
| 3 | 0.06 | — | 0.38 | 12.95 | 3.36 | 5.15 | 1.47 | —  | —  | "  |
| 4 | 0.05 | — | 0.34 | 13.20 | 6.05 | 0.53 | 0.59 | —  | —  | "  |

TABLE 2

|    | After Heat Treatment | | | As Weld | | |
|----|--------|----------------|------|--------|----------------|------|
|    | C.E.I. | Phase          | σ0.2 | C.E.I. | Phase          | σ0.2 |
| 1  | 25     | ε              | —    | 26     | ε              |      |
| 2  | 20     | γ              | —    | 20     | γ              |      |
| 3  | 21     | γ              | —    | 20     | γ              |      |
| 4  | 18     | γ              | —    | 19     | γ              |      |
| 5  | —      | γ              | —    | 15     | γ              |      |
| 6  | 11     | γ              | —    | 10     | γ              |      |
| 7  | 20     | ε              | —    | 19     | ε              |      |
| 8  | 20     | ε              | 19   | 23     | ε              |      |
| 9  | 14     | γ              | 9    | 16     | γ              |      |
| 10 | 19     | γ              | 13   | 20     | γ              |      |
| 11 | 17     | γ              | 8    | 17     | γ              |      |
| 12 | 9      | γ + ε          | 10   | 10     | γ + ε          |      |
| 13 | 22     | ε              | 13   | 21     | ε              |      |
| 14 | 16     | γ              | 14   | 15     | γ              |      |
| 15 | 11     | γ              | 14   | 12     | γ              |      |
| 16 | 20     | ε              | 11   | 20     | ε              |      |
| 17 | 18     | γ              | —    | 19     | γ              |      |
| 18 | 10     | γ              | —    | 10     | γ              |      |
| 19 | 24     | ε              | 17   | 24     | ε              |      |
| 20 | 21     | ε              | —    | 22     | ε              |      |
| 21 | 21     | ε + α'         | —    | 23     | ε + α'         |      |
| 22 | 19     | γ              | —    | 17     | γ              |      |
| 23 | 16     | γ              | —    | 15     | γ              |      |
| 24 | 19     | γ              | —    | 20     | γ              |      |
| 25 | 19     | ε              | —    | 18     | ε              |      |
| 26 | 13     | γ              | 10   | 10     | γ              |      |
| 27 | 14     | γ + ε          | 11   | 12     | γ + ε          |      |
| 28 | 21     | ε              | 13   | 23     | ε              |      |
| 29 | 16     | γ              | —    | 17     | γ              |      |
| 30 | 16     | γ              | —    | 17     | γ              |      |

TABLE 2-continued

| | After Heat Treatment | | | As Weld | | |
|---|---|---|---|---|---|---|
| | C.E.I. | Phase | σ0.2 | C.E.I. | Phase | σ0.2 |
| 31 | 13 | γ | — | 14 | γ | |
| 32 | 17 | ε | — | 18 | ε | |
| 33 | 19 | γ | 15 | 17 | γ | |
| 34 | 18 | γ | — | 21 | γ | |
| 35 | 24 | γ | 14 | 24 | γ | |
| 36 | 22 | γ + ε | — | 25 | γ + ε | |
| 37 | 18 | γ | — | 19 | γ | |
| 38 | 21 | γ | | 21 | γ | |
| 39 | 22 | γ | — | 21 | γ | |
| 40 | 18 | γ | — | 20 | γ | |
| 41 | 19 | γ | — | 22 | γ | |
| 42 | 24 | γ | — | 23 | γ | |
| 43 | 25 | γ | — | 26 | γ | |
| 44 | 21 | γ + ε | — | 21 | γ + ε | |
| 45 | 20 | ε | — | 22 | ε | |
| 46 | 21 | ε | — | 23 | ε | |
| 47 | 22 | γ | — | 21 | γ | |
| 48 | 24 | γ | — | 24 | γ | |
| 49 | 18 | γ | — | 17 | γ | |
| 50 | 15 | γ + ε | — | 17 | γ + ε | |
| 51 | 19 | γ | — | 18 | γ | |
| 52 | 17 | γ | — | 17 | γ | |
| 53 | 17 | γ | — | 18 | γ | |
| CONTROL | | | | | | |
| 1 | 30 | γ | 23 | 30 | γ | |
| 2 | 53 | α′ | — | 52 | α′ | |
| 3 | 29 | α′ | 66 | 29 | α′ | |
| 4 | 40 | α′ | — | 39 | α′ | |

EXAMPLES

Materials having the chemical composition shown in Examples 1–53 of Table 1 were melted in an induction furnace were treated with a solid-solution treatment at 1100 degrees C. for two hours, and then cooled in air to room temperature of about 20° C. A part of the sample was extended to a diameter of 2.4 mm. Specimens were produced by welding this sample on a water turbine runner model made of 13 percent chromium cast steel by TIG (tungsten inert gas) welding using an electric current of approximately 100–120 Amps. The specimens were immersed in pure water at 25° C. and exposed to electrostrictive vibrations at a frequency of 6.5 KHz and a traveling distance of 100μ for 180 minutes to measure the weight loss caused by cavitation erosion (g). The cavitation erosion index (C.E.I.), represented as cm³/minute, was obtained from the following equation:

$$C.E.I. = \frac{W}{t\rho} \times 10^6$$

wherein W represents the weight loss caused by cavitation erosion cubic centimeter (cm³), t represents the test time (minutes) and ρ represents the specific gravity.

Results thus obtained are shown in Table 2.

The main phase of the specimens in Examples 1–53 was determined by observation through an optical microscope, X-ray diffraction, and measurement of heat expansion. Results thus obtained are also shown in Table 2.

The 0.2 percent proof stress of the specimens of Examples 8–16, 19, 26–28, 33, and 35 was measured and the results thus obtained are also shown in Table 2.

Material having the chemical composition shown in the example identified as Control 1 in Table 1 was conventional SUS 304 austenitic stainless steels. The same heat-treatment described above was also carried out on this material to produce specimens. Materials having the chemical compositions shown in the examples identified as Control numbers 2–4 of Table 1 were melted and normalized at 1100 degrees C. for two hours, and then tempered at 650 degrees C. for two hours to produce specimens. The control specimens produced contain martenistic stainless steel.

The properties determined for the specimens produced according to the present invention were also determined for the control specimens. Results thus obtained are also shown in Table 2.

Figure 3:
FIG. 3 is a photograph of the microstructure of one example of the stainless steel prepared according to the present invention, in which the phase of the stainless steel is its austenite phase.
Figure 4:
FIG. 4 is a photograph of the microstructure of another example of the stainless steel according to the present invention, in which the phase of the stainless steel is the Epsilon phase.
Figure 5:
FIG. 5 is a photograph of the microstructure of conventional stainless steel, in which the phase of the stainless steel is its martensite phase.

The micro-structure of the specimen in Example 14 whose main phase is the γ phase is shown in FIG. 3. The microstructure of the specimen in Example 13 whose main phase is the ξ phase is shown in FIG. 4. The micro-structure of the specimen in Control 2 whose main phase is the α′ phase is shown in FIG. 5.

As is apparent from Table 2, the C.E.I. values of the specimens produced according to the present invention are less than 26 and are lower than the CEI values of the control specimens thereby showing that there has been less weight loss (w) caused by cavitation erosion which also shows that the smaller the C.E.I. number the better the resistance. It is particularly apparent that each specimen produced according to the subject invention has remarkably excellent cavitation erosion resistance as compared with 13-chromium stainless cast steel (Control No. 2) which has been widely used as the structural material in the production of conventional water turbine elements and whose C.E.I. exceeds 53. It is equally apparent that each specimen produced according to the present invention has remarkably excellent cavitation erosion resistance as compared with SUS 304 austenitic stainless steel (Control No. 1), whose C.E.I. is 30.

Stainless steel produced according to the present invention, however, has a low·enough proof stress so that it is unsuitable for use as the structure material for manufacturing water turbine elements which are required to have high strength. It is suitable though for use as the material for making or repairing those portions of water turbine elements damaged by cavitation erosion. Particularly, stainless steel of the present invention has low proof stress and is, therefore, suitable to be formed on the surface of water turbine elements by overlay welding.

In overlay welding, if the coefficient of heat expansion of a matrix is different from that of the welded metal, stress is generated at the interface between the matrix and the weld metal when they contact during cooling after welding. Such stress causes residual strain at the interface which can result in rupture and deformation of the stainless steel. The effect is most pronounced when martensitic stainless steel is used as a matrix, and great strain is generated at the time of martinsitic transformation. It is, therefore, desirable that the proof stress of the overlay welding material be sufficiently low so that plastic deformation of the weld metal can serve to relieve the stress generated at the interface. The stainless steel produced according to the present invention has a proof stress less than 20 kg/MM² which is much than the proof stress of control specimen 1; thus, it is remarkably well suited for use as overlay welding material.

Figure 2:
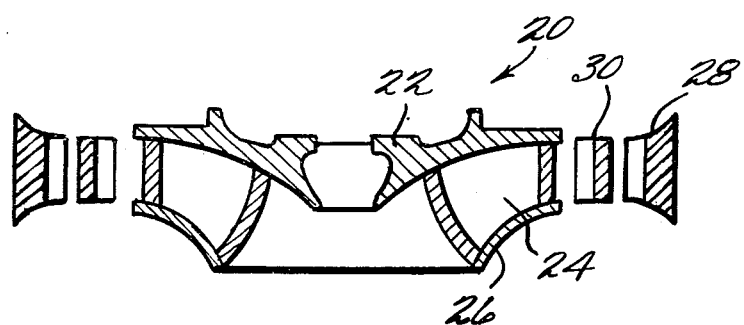
FIG. 2 is a sectional view of the water turbine runner shown in FIG. 1 together with added outer vane structures.

FIG. 1 is a perspective view showing a water turbine runner, generally indicated at 20, which exhibits portions damaged by cavitation erosion after having been employed in a turbine used at a water power plant. FIG. 2 is a sectional view of the water turbine runner 20, shown in FIG. 1, and additional turbine elements.

FIGS. 1 and 2 show a crown 22, runner blades 24, a shroud 26, stay vanes 28 and guide vanes 30. Water turbine runner 20, stay vanes 28 and guide vanes 30 are each made from 13-chromium - 3.5-nickel martensitic stainless cast steel or similar material which serves as a matrix or substrate and for the stainless steel of the present invention, which is preferably formed in a layer having a thickness of about 5 mm by overlay welding on cavitation erosion-damaged surfaces. The surfaces where stainless steel according to the present invention will be applied are those portions where water will initially strike the device such as at 24-1 near the water entrance of runner blades when in a generation operation mode, or at 24-2 near the water entrance of runner blades when in a pumping operation mode, or those on the outside edge of stay vanes 28 or guide vanes 30. The overlay welding can be carried out by any conventional welding manner such as TIG welding (tungsten-inert-gas welding) and MIG welding (metal-electrode-inert-gas welding). Stainless steel according to the present invention can also be welded onto the substrate of water turbine elements by braze welding, electric welding or manual welding.

As described above, stainless steel according to the present invention has excellent cavitation erosion resistance. It also has lower proof stress which makes it especially suitable for overlay welding and can be manufactured easily. Therefore, it is extremely suitable for use as a material for cladding cavitation erosion damaged portions of propellers for ships, pump elements of every kind and so on as well as material for water plants turbine elements such as water turbine runners, stay vanes and guide vanes.

While the invention has been described in connection with what is presently considered to be the most practical and preferred embodiments, it is to be understood that the invention is not to be limited to the disclosed embodiments but on the contrary, is intended to cover various modifications and equivalents included within the spirit and scope of the appended claims, which scope is to be accorded the broadest interpretation so as to encompass all such modifications and equivalents.

What is claimed is:

1. A high cavitation erosion resistance stainless steel for use in hydraulic machine of which surfaces are damaged by cavitation erosion comprising at least either carbon of no more than about 0.2 weight percent or nitrogen in an amount ranging from about 0.02 to about 0.3 weight percent together with silicon of no more than about 2.0 weight percent, chromium in an amount ranging from about 11.0 to about 15.0 weight percent, nickel of over 3.0 to about 10.0 weight percent and manganese in an amount varying from about 2.0 to about 20.0 weight percent, with the remainder of said steel being comprised essentially of iron, and in which the ferrite phase has not been formed so that the microstructure of the stainless steel is ferrite free but where at least either the epsilon phase or the austenite phase has been essentially formed.

2. A high cavitation erosion resistance stainless steel for use in hydraulic machine of which surfaces are damaged by cavitation erosion, comprising carbon of no more than 0.2 weight percent, nitrogen of about 0.02 to about 0.3 weight percent, silicon of no more than 2.0 weight percent, chromium of about 11.0 to about 15.0 weight percent, nickel of over 3.0 to about 10.0 weight percent, manganese of over 2.0 to about 20.0 weight percent, the remainder of said steel being comprised essentially of iron, and in which the ferrite phase has not been formed so that the microstructure is ferrite free but where the austenite and the epsilon phases have been essentially formed.

3. Stainless steel according to claim 1 or 2, wherein carbon content is in the range of from about 0.3 to about 0.15 weight percent.

4. Stainless steel according to claim 1 or 2, wherein manganese is in the range of from about 4.0 to about 15.0 weight percent.

5. Stainless steel according to claim 3, wherein nickel is in the range of over 3.0 to about 7.0 weight percent.

6. A high cavitation erosion resistance stainless steel for use in hydraulic machine of which surfaces are damaged by cavitation erosion, comprising at least one element chosen from the group carbon of no more than 0.2 weight percent, nitrogen of from about 0.2 to about 0.3 weight percent, together with silicon of no more than 2.0 weight percent, chromium of from about 11.0 to about 15.0 weight percent, nickel of over 3.0 to about 10.0 weight percent, manganese of over 2.0 to about 20.0 weight percent, said stainless steel further including at least one element chosen from the group comprised of molybdenum of no more than 2.0 weight percent, niobium of from about 0.01 to about 0.1 weight percent and cobalt of from about 0.5 to about 5.0 weight percent, the remainder of said steel being comprised essentially of iron, and in which the ferrite phase has not been formed so that the microstructure is ferrite free where the epsilon phase has been essentially formed.

7. A high cavitation erosion resistance stainless steel for use in hydraulic machine of which surfaces are damaged by cavitation erosion, comprising carbon of no more than 0.2 weight percent, nitrogen of from about 0.2 to about 0.3 weight percent, together with silicon of no more than 2.0 weight percent, chromium of from about 11.0 to about 15.0 weight percent, nickel of over 3.0 to about 10.0 weight percent, manganese of over 2.0 to about 20.0 weight percent, said stainless steel further including at least one element chosen from the group comprised of molybdenum of no more than 2.0 weight percent, niobium of from about 0.01 to about 0.1 weight percent and cobalt of from about 0.5 to about 5.0 weight percent, the remainder of said steel being comprised essentially of iron, and in which the ferrite phase has not been formed so that the microstructure is ferrite free where the austenite and the epsilon phases have been essentially formed.

8. Stainless steel according to claim 6 wherein molybdenum is in the range of from about 0.5 to about 1.5 weight percent.

9. Stainless steel according to claim 6 wherein molybdenum is in the range of from about 1.0 to about 1.5 weight percent.

10. Stainless steel according to claims 6 or 7 wherein cobalt is in the range of from about 0.5 to about 3.0 weight percent.

11. Stainless steel according to claim 8, wherein cobalt is in the range of from about 1.5 to about 2.0 weight percent.

12. Stainless steel according to claim 6, 7, 8, or 9, wherein niobium is in the range of from about 0.01 to about 0.05 weight percent.

13. A water turbine element where surfaces damaged by cavitation erosion are comprised of high cavitation erosion resistance stainless steel comprising at least either carbon of no more than about 0.2 weight percent or nitrogen in an amount ranging from about 0.02 to about 0.3 weight percent, together with silicon of no more than about 2.0 weight percent, chromium in an amount ranging from about 11.0 to about 15.0 weight percent, nickel of over 3.0 to about 10.0 weight percent, and manganese of over 2.0 to about 20.0 weight percent, with the rest of said steel being comprised essentially of iron, and in which the ferrite phase has not been formed so that the microstructure is ferrite free but where at least either the epsilon phase or the austenite phase has been essentially formed.

14. A water turbine element according to claim 13, further comprising at least one element selected from the group consisting of molybdenum of no more than 2.0 weight percent, niobium of from about 0.01 to about 0.1 weight percent and cobalt of from about 0.5 to about 5.0 weight percent.

15. A water turbine element according to claim 13 or 14 wherein said stainless steel has been formed by a manner of overlay welding.

16. Stainless steel according to claim 5, wherein cobalt is in the range of from about 0.5 to about 3.0 weight percent.

17. A stainless steel according to claim 1, 2, 6 or 7 wherein said stainless steel has a proof stress less than 20 Kg/mm$^2$.

18. A water turbine element according to claim 13 wherein said stainless steel has a proof stress less than 20 KG/mm$^2$.

* * * * *